(12) United States Patent
Aronstam et al.

(10) Patent No.: US 6,995,677 B2
(45) Date of Patent: *Feb. 7, 2006

(54) APPARATUS AND METHODS FOR MONITORING PIPELINES

(75) Inventors: Peter S. Aronstam, Houston, TX (US); Colin N. Morrison, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 130 days.

This patent is subject to a terminal disclaimer.

(21) Appl. No.: 10/700,093

(22) Filed: Nov. 3, 2003

(65) Prior Publication Data

US 2004/0211272 A1   Oct. 28, 2004

Related U.S. Application Data

(63) Continuation-in-part of application No. 10/421,475, filed on Apr. 23, 2003, now Pat. No. 6,891,477.

(51) Int. Cl.
*G08B 21/00* (2006.01)

(52) U.S. Cl. .............. 340/606; 340/854.6; 73/152.18

(58) Field of Classification Search .. 340/854.3–854.6, 340/855.7, 855.8, 870.01, 870.03, 870.05, 340/870.16, 870.18, 870.25, 870.26, 606; 73/196, 1.35, 152.18, 19.04, 1.16
See application file for complete search history.

(56) References Cited

U.S. PATENT DOCUMENTS

| | | | |
|---|---|---|---|
| 3,943,758 A | 3/1976 | Wolf et al. | 73/88.5 R |
| 4,006,359 A | 2/1977 | Sullins et al. | 250/358 P |
| 4,015,194 A | 3/1977 | Epling | 324/1 |
| 4,055,315 A | 10/1977 | Gvelesiani et al. | 243/33 |
| 4,061,965 A | 12/1977 | Nelson | 324/29 |
| 4,087,781 A | 5/1978 | Grossi et al. | 340/18 |
| 4,369,713 A | 1/1983 | Richardson | 104/138 R |
| 4,601,204 A | 7/1986 | Fournot et al. | 73/432 R |
| 4,852,391 A | 8/1989 | Ruch et al. | 73/40.5 R |
| 5,149,387 A | 9/1992 | Moore, Sr. | 156/241 |
| 5,284,096 A | 2/1994 | Pelrine et al. | 104/138.2 |
| 5,289,722 A | 3/1994 | Walker et al. | 73/775 |
| 5,355,807 A | 10/1994 | Pelrine et al. | 105/78 |
| 5,370,006 A | 12/1994 | Zollinger et al. | 73/865.8 |
| 5,371,363 A | 12/1994 | Lilimpakis | 250/253 |
| 5,390,964 A | 2/1995 | Gray, Jr. | 285/93 |
| 5,404,948 A | 4/1995 | Fletcher | 166/250 |
| 5,489,126 A | 2/1996 | Gray, Jr. | 285/93 |
| 5,505,093 A | 4/1996 | Giedd et al. | 73/774 |

(Continued)

OTHER PUBLICATIONS

Cantrell, "Silicon Update: The Dust Flies", http://www.circuitcellar.com/online, (Mar. 2002), 4 pages.

(Continued)

*Primary Examiner*—Jeffery Hofsass
*Assistant Examiner*—Jennifer Stone
(74) *Attorney, Agent, or Firm*—Madan, Mossman & Sriram, P.C.

(57) ABSTRACT

A system for monitoring at least one parameter of interest relating to a flow conduit having a through passage and a fluid flow therein comprises at least one measurement station coupled to the flow conduit for taking a measurement relating to the parameter of interest. An interrogation device is adapted to move proximate the measurement station and to transmit a first signal to the measurement station, and to receive a second signal from the measurement station relating to the parameter of interest. The measurement station receives power from the first signal.

59 Claims, 7 Drawing Sheets

U.S. PATENT DOCUMENTS

| | | | | |
|---|---|---|---|---|
| 5,553,504 | A | 9/1996 | Lyons et al. | 73/799 |
| 5,720,342 | A | 2/1998 | Owens et al. | 166/57 |
| 5,878,783 | A | 3/1999 | Smart | 138/93 |
| 5,947,213 | A | 9/1999 | Angle et al. | 175/24 |
| 6,068,394 | A | 5/2000 | Dublin, Jr. | 364/508 |
| 6,377,203 | B1 * | 4/2002 | Doany | 342/44 |
| 6,427,602 | B1 | 8/2002 | Hovis et al. | 104/138.1 |
| 6,450,104 | B1 | 9/2002 | Grant et al. | 104/138.2 |
| 6,462,672 | B1 | 10/2002 | Besson | 340/853.2 |
| 6,498,568 | B1 * | 12/2002 | Austin et al. | 340/854.5 |
| 6,538,576 | B1 * | 3/2003 | Schultz et al. | 340/854.6 |
| 6,798,338 | B1 * | 9/2004 | Layton | 340/310.01 |
| 2001/0029989 | A1 | 10/2001 | Paz | 138/104 |
| 2002/0043369 | A1 | 4/2002 | Vinegar et al. | 166/250.07 |
| 2003/0098799 | A1 | 5/2003 | Zimmerman | 340/854.6 |
| 2004/0257241 | A1 * | 12/2004 | Menger | 340/854.3 |

OTHER PUBLICATIONS

Horton et al., "MICA: The Commercialization of Microsensor Motes", Sensor Technology and Design, http://www.sensorsmag.com, (Apr. 2002), [retrieved Mar. 20, 2003], 8 pages.

Fitzgerald, "Not Content to Gather Dust in the Lab, Pioneer Brings Motes to Market", News About MEMS, Nanotechnology and Microsystems, http://www.smalltimes.com, (Feb. 26, 2003), [retrieved Mar. 20, 2003], 3 pages.

* cited by examiner

View A-A
FIG. 9B

APPARATUS AND METHODS FOR MONITORING PIPELINES

CROSS-REFERENCE TO RELATED APPLICATIONS

The present application is a Continuation-in-Part of U.S. patent application Ser. No. 10/421,475 filed on Apr. 23, 2003 now U.S. Pat. No. 6,891,477, which is incorporated herein by reference.

BACKGROUND OF THE INVENTION

1. Field of the Invention

This invention relates to monitoring of flow conduits, such as a gas pipelines, and more particularly to an articulated mobile sensing and interrogation device for measuring parameters of interest of the flow conduit and remotely interrogating sensors attached to the pipeline.

2. Description of the Related Art

Fluid conduits such as pipelines and aqueducts extend for tens, hundreds, or thousands of kilometers and may be used to transport liquids, gases, slurries or combinations thereof. Such conduits may have multiple sections that run above or below ground. Sections may be run underground to avoid natural obstacles such as rivers or simply as a safety precaution. Other sections may be run above ground depending on the topography and underlying strata. Sensing stations are commonly located at major features, such as pumping station that may be separated by tens or hundreds of kilometers. Sensors are used to determine any of a number of parameters of interest related to the operation and safety of the conduit and/or related to the fluid transported therein. However, due to the relatively large separation of these stations, conditions that may be indicative of potential problems or failures may go undetected until they become so great as to cause a catastrophic event, such as for example a substantial leak that may be a serious environmental problem. It would be highly desirable to be able to determine various parameters relating to the physical condition of the conduit including, but not limited to, mechanical strain and stress, crack initiation and propagation, temperature, acceleration and vibration, seismic events, corrosion, pressure integrity, and flowing fluid properties, such as chemical species, radiation, and chemical contamination. The very nature of the length and location of such conduits, however, make the distribution of power and signal lines to multiple measurement stations substantially impractical and cost prohibitive.

Mobile devices, commonly called pigs, may be moved through a pipeline by the fluid pressure within the pipeline to provide information regarding the condition of the pipeline. The device can perform any number of tasks that can vary between simple tasks, such as cleaning pipelines, to more sophisticated tasks such as measurement of metal loss of the pipe due to corrosion, cracks, deformation and the like. Pigs that perform these tasks are called "smart pigs". Smart pigs may consist of various modules, in which one of the modules commonly performs the function of propelling the smart pig through the pipeline. Such devices can have on-board devices for sensing a limited range of parameters of interest about the pipeline as the mobile device passes through the pipeline. Typically such devices detect parameters related to wear and corrosion, such as pipe diameter and/or magnetic flux leakage (MFL). Actual in situ physical parameters of the pipeline, such as those described previously, require sensors physically attached to the pipeline. Such sensors should preferably be self-contained such that they do not require electrical connections via cables. An example of such self-contained sensors is disclosed in U.S. patent application Ser. No. 10/421,475 filed on Apr. 23, 2003, previously incorporated herein by reference. Other parameters and tests may also be required to be carried out by the mobile device.

There is a demonstrated need, therefore, for a mobile device capable of performing tests along a pipeline as well as interrogating remote sensors attached to the pipeline.

SUMMARY OF THE INVENTION

The present invention contemplates a system including a mobile interrogation device for traversing a pipeline and monitoring various parameters related to the integrity of the pipeline.

In one preferred embodiment, a system for monitoring at least one parameter of interest relating to a pipeline having a fluid flow therein, comprises at least one measurement station coupled to the pipeline for taking a measurement relating to the parameter of interest. A flow propelled interrogation device is adapted to move proximate the measurement station. The interrogation device is further adapted to transmit a first signal to the measurement station and to receive a second signal from the measurement station relating to the parameter of interest.

In one aspect, a method for monitoring at least one parameter of interest relating to a pipeline having a fluid flow therein, comprises coupling at least one measurement station to the pipeline at a predetermined location. The measurement station is adapted to measure the at least one parameter of interest. A flow propelled interrogation device is passed proximate the at least one measurement station. A first signal is transmitted from the interrogation device to the measurement station, with the measurement station measuring the at least one parameter of interest in response thereto. The flow propelled interrogation device receives a second signal related to the parameter of interest transmitted by said measurement station.

In another aspect, an interrogation device for determining at least one parameter of interest relating to a gas pipeline, comprises at least one housing having a plurality of wheel assemblies mounted thereon,. The wheel assemblies are extendable to contact an inner wall of the pipeline. A sail is engaged with the housing for intercepting at least a portion of the fluid flow for propelling the interrogation device along the pipeline. A controller controls the motion of the interrogation device. The controller also transmits at least one first signal to and receives at least one second signal from at least one measurement station attached to the pipeline. A power source supplies power to the controller.

In yet another aspect, a method for determining at least one parameter of interest related to a pipeline having a gas flowing therethrough, comprises traversing an interrogation device through the pipeline. The interrogation device is adapted to provide a predetermined pressure disturbance for inducing a predetermined strain in the pipeline. A first signal is transmitted from the interrogation device to each of the plurality of measurement stations as the interrogation device moves proximate each of said plurality of measurement stations. The measurement station measures the at least one parameter of interest in response to the first signal. The interrogation device receives a second signal related to the parameter of interest transmitted by the measurement station.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals, wherein.

DESCRIPTION OF PREFERRED EMBODIMENTS

Figure 1:
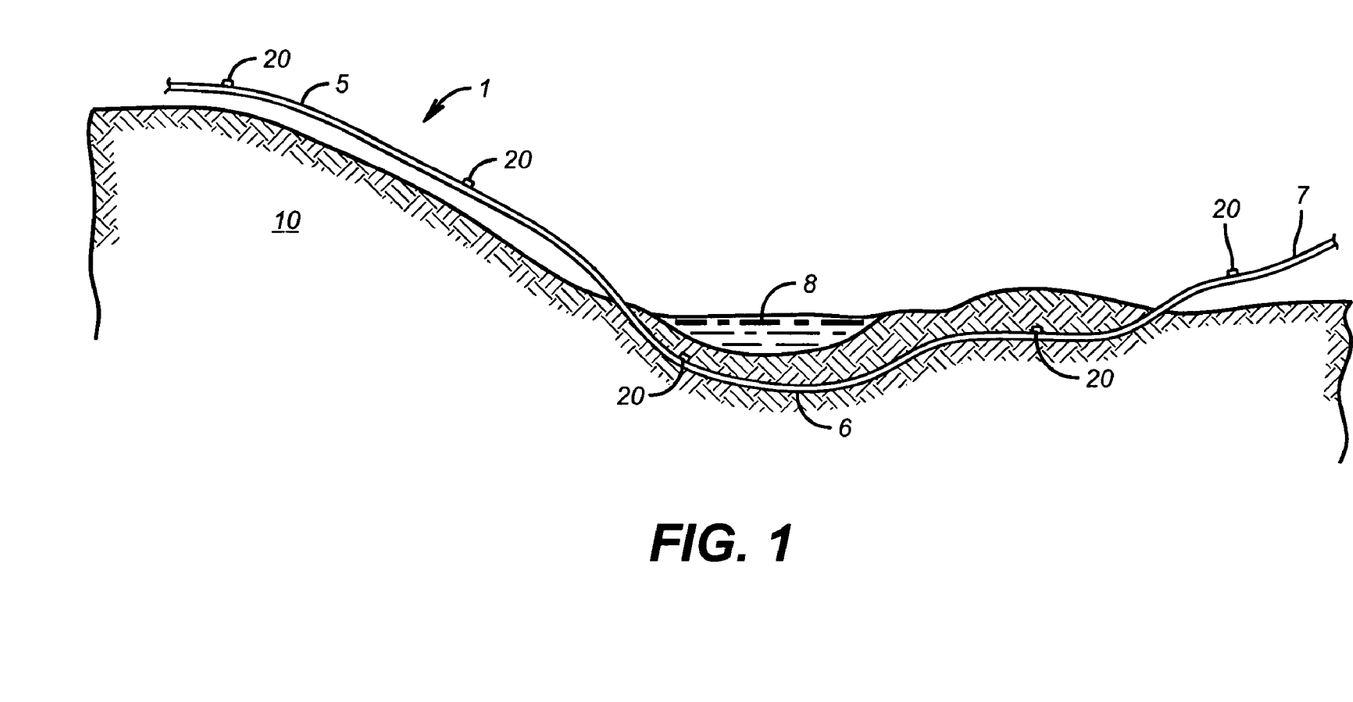
FIG. 1 is a schematic drawing of a fluid conduit traversing an uneven terrain.

In one preferred embodiment, see FIG. 1, a fluid conduit 1 extends across terrain 10. Note that the term fluid conduit as used herein, means a closed conduit, such as a pipeline or other substantially tubular member, and an open conduit such as an aqueduct for transporting liquids such as water. Such conduits may extend for tens, hundreds, or thousands of kilometers and may be used to transport liquids, gases, slurries or other fluids. The conduit 1, for example may be a pipeline having multiple sections 5, 6, 7 that run above or below ground. Sections may be run underground to avoid natural obstacles such as river 8 or simply as a safety precaution. Other sections may be run above ground depending on the topography and underlying strata. Self contained measurement and information stations 20, called measurement stations for simplicity, are disposed along conduit 1 at predetermined locations, to determine any of a number of parameters of interest related to the operation and safety of the conduit and/or related to the fluid transported therein. The greater the number of measurement stations 20, the better will be the confidence that the conduit is operating properly. Various parameters may be measured relating to various physical conditions including, but not limited to, mechanical strain and stress, crack initiation and propagation, temperature, acceleration and vibration, seismic events, corrosion, pressure integrity, and flowing fluid properties, such as flow rate and chemical species, radiation, and chemical contamination. For an open channel, such as an aqueduct, measurement stations 20 may be mounted to determine parameters related to the flow channel such as, for example, seismic events, and/or for determining parameters related to the flowing fluid. Such fluid related parameters, for a water supply flow for example, may relate to chemical analysis and water purity or to contamination by chemical and/or biological agents. The very nature of the length and location of such conduits make the distribution of power and signal lines to multiple measurement stations 20 physically impractical and cost prohibitive.

Figure 2:
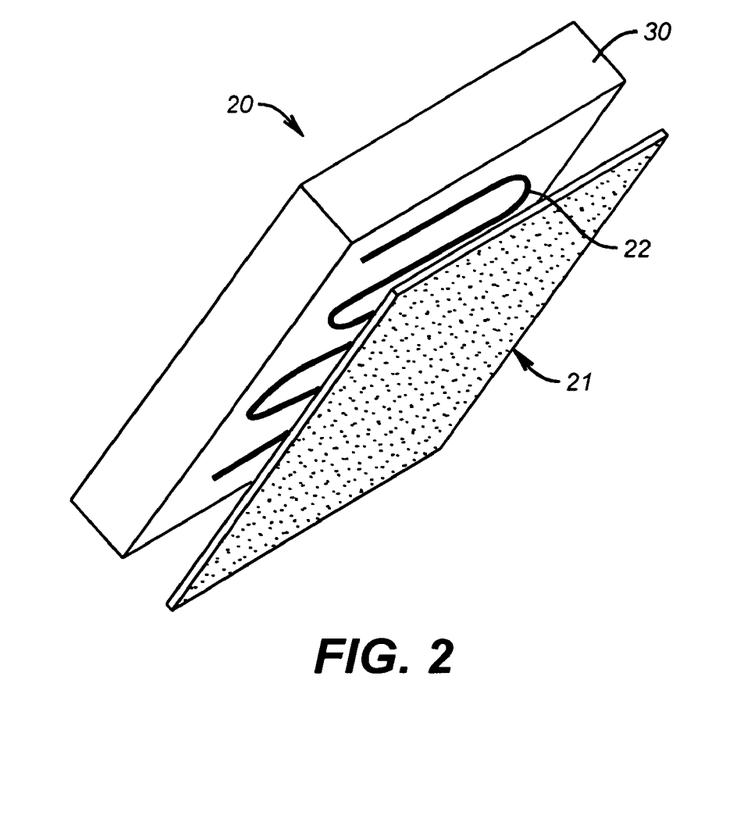
FIG. 2 is a schematic drawing of a self contained measurement and information station according to one embodiment of the present invention.

FIG. 2 shows one preferred embodiment of measurement station 20 having measurement module 30, radio frequency (RF) transmitting and receiving antenna 22, and flexible adhesive base 21 for attaching measurement module 30 to flow conduit 1. In one embodiment, see FIG. 3, measurement module 30 includes at least one sensor 27 for detecting the parameter of interest. Alternatively, sensor 27 may be external to measurement module 30 and suitably electrically connected using techniques known in the art. Interface module 24 conditions the output signal from sensor 27, if necessary, and transfers the signal to data memory in controller module 23. Controller module 23 has a processor with sufficient memory for storing program instructions and for storing acquired sensor measurement data. The controller module may contain a unique identification, such as a digital identifier, for uniquely identifying each measurement station 20 that may be used for correlating the measurements with location on the conduit 1. Also included is RF transceiver 26 for receiving command and power signals and for transmitting data signals in response to the received command signals.

Figure 3:
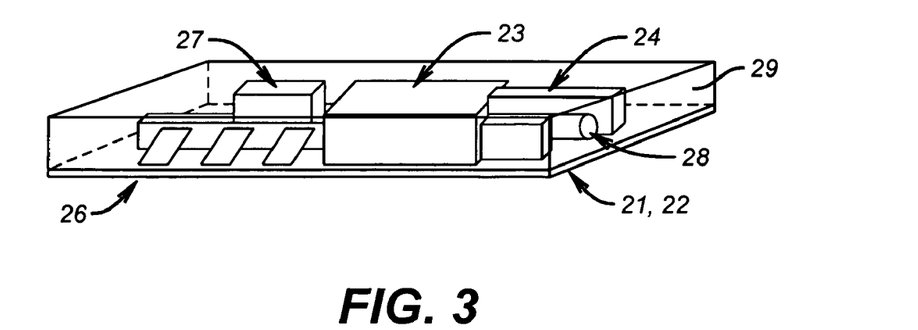
FIG. 3 is a schematic drawing of a measurement module of a self contained measurement and information station according to one embodiment of the present invention.

In one preferred embodiment, the measurement module 30 has no internal power source, but receives power via the received RF signal. This power is converted to usable power by power module 28. Sensor 27 is chosen as a low power sensor such that the RF link transmits sufficient power to power measurement module 30 including sensor 27 and to transmit the resulting data signal using RF transceiver 26. The components of measurement module 30 are encapsulated in a suitable compound 29 to protect the components from the environment.

Figure 4:
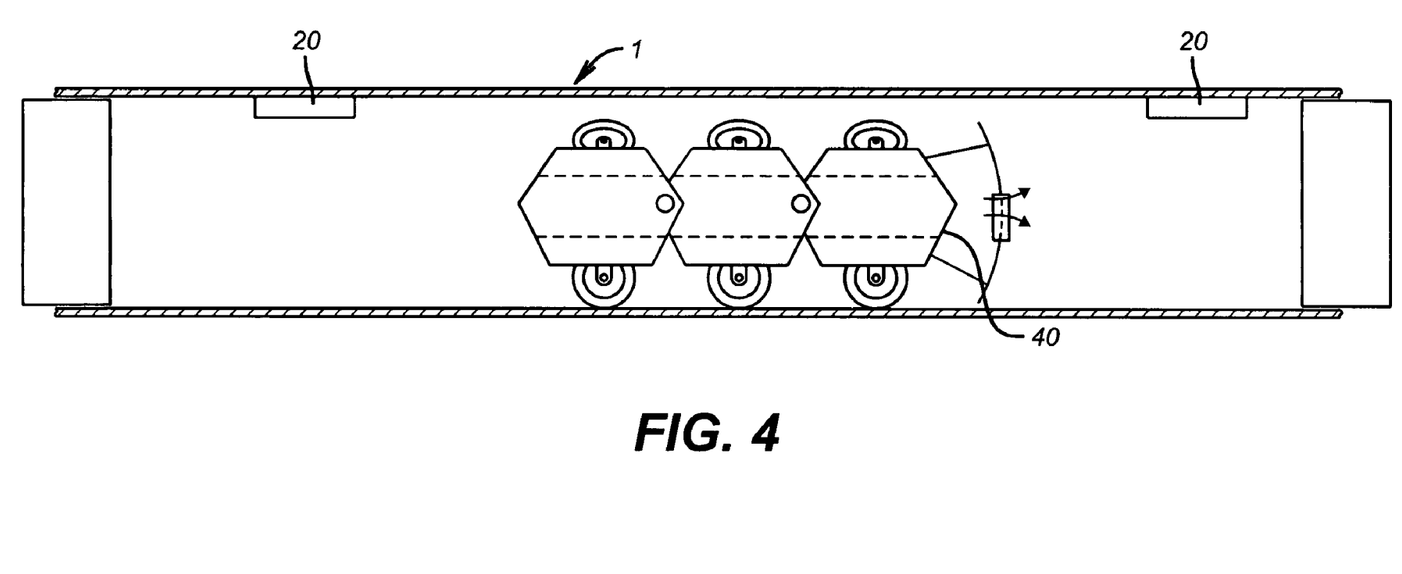
FIG. 4 is a schematic drawing of an articulated conduit inspection pig for use as a mobile interrogation device according to one embodiment of the present invention.

The RF command signal and RF power are transmitted from, and the data signals received by, a mobile interrogation device (see FIGS. 4 and 5) such as an internal inspection pig 40, an automotive device 45, and an aircraft device 50. Inspection pigs are commonly self-powered for movement in the conduit or, alternatively, may be pumped through flow conduit 1. Any type of inspection pig is suitable for this invention The automotive device 45 may be any common vehicle including, but not limited to an automobile, a truck, and an all-terrain vehicle. The automotive device, is adapted to carry an RF transceiver (not shown) and a controller (not shown) transmitting command signals and power to measurement stations 20 and receiving and storing data signals from measurement stations 20. The aircraft device 50 may be an airplane, helicopter, or any suitable aircraft and may be manned or a remotely controlled, unpiloted aircraft.

Figure 5:
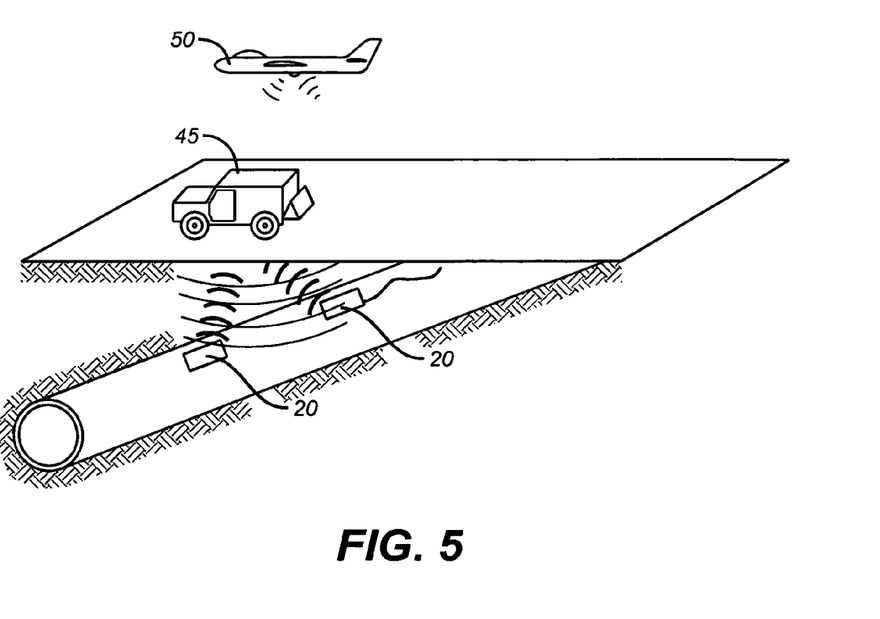
FIG. 5 is a schematic drawing showing an automotive device and an aircraft device for use as mobile interrogation devices according to one embodiment of the present invention.

Remotely controlled aircraft device 50 may be preprogrammed to follow a predetermined flight pattern along the known path of flow conduit 1, using, for example, preprogrammed way points and GPS signals to guide aircraft device 50 along the predetermined flight pattern. Relatively small remotely controlled vehicles are commercially available.

The placement of a particular measurement station 20 at a predetermined location and the type of flow conduit 1 will be used to determine the type of interrogation device used for that particular measurement station 20. For example, the flow conduit 1 may be (i) a tubular conduit of metallic material such as steel, (ii) a tubular conduit out of a non-metallic material such as a composite material, or (iii) an open-channel conduit. For a metallic conduit, the RF energy will not penetrate the conduit. Therefore, a measurement station 20 mounted inside the metallic conduit 1 (see FIG. 4) requires an internal interrogation device such as a pipeline pig 40. A measurement station 20 mounted outside of a metallic conduit 1 (see FIG. 5) requires an external interrogation device such as automotive device 45 and/or aircraft device 50. For a composite material, the conduit 1 is substantially transparent to RF energy and allows the measurement station 20 to be mounted internally, externally, and/or embedded within the conduit and be able to operate with an internal and/or external interrogation device.

The sensors 27 used to detect the parameters of interest include, but are not limited to, (i) mechanical strain gages, (ii) fiber optic strain gages, (iii) ultrasonic detectors for detecting micro-crack initiation and propagation, (iv) accelerometers, (v) temperature sensors, including distributed fiber optic temperature sensors known in the art, (vi) pressure sensors, (vii) corrosion detectors, (viii) radiation detectors, (ix) spectroscopic chemical detectors, and (x) ultrasonic detectors for measuring the wall thickness of the flow conduit for detecting erosion and/or corrosion of the conduit. The sensors 27 may detect characteristics associated with the conduit and/or the fluid flowing therein. One skilled in the art will recognize that many of the sensors, for example accelerometers and seismic detectors, are currently achievable using Micro Electromechanical Systems (MEMS) fabrication techniques for providing low power consumption devices. Other sensors are available using piezoelectric crystal technology or resonant crystal technology that require very low power consumption. Thermocouple temperature sensors, for example, generate their own electrical signal and do not require external power to operate.

In operation, the measurement stations 20 are disposed along the flow conduit 1. The measurement stations 20 may be both above and below ground along the length of flow conduit 1 depending on the path of conduit 1. An interrogation device is caused to pass in relative proximity to the measurement stations 20. The interrogation device has an RF transceiver for transmitting command signals and power to the measurement stations 20 and for receiving data signals from the measurement stations 20. The data collected is downloaded from the interrogation device, using techniques known in the art, to a central control station (not shown) for monitoring the various parameter data collected.

In another preferred embodiment, measurement module 30 includes an internal power source (not shown) for powering the electronic devices and sensors as required. The internal power source may include, but is not limited to, (i) a commercially packaged battery, (ii) a thick film battery integrally attached to the measurement module, (iii) a piezoelectric power source deriving power from shock and vibration in the proximity of the measurement module, (iv) a solar cell integrated into an external surface of the measurement module, and (v) a thermoelectric generator integrated into the measurement module. All of these power sources are known in the art. Any combination of these sources may be used and their selection is application specific, and may be determined without undue experimentation, by considering such factors as (i) power required for the type of sensors, (ii) transmission strength required of data signals, and (iii) location of measurement station and flow conduit (for example, above ground or below ground).

In another preferred embodiment, the power sources described above are mounted external to the measurement module 30 and connected to the measurement module via connectors and/or cables using techniques known in the art.

In one preferred embodiment, measurement module 30 contains a real time clock for time stamping measurements. A low power seismic detector, for example, may be continuously measuring seismic activity, but the data is only stored and time stamped if the sensed event exceeds a predetermined threshold or alarm criterion. The data is retrieved by the interrogation device and may be used to indicate that more extensive inspection is needed in the area where the seismic event was detected.

Figure 6:
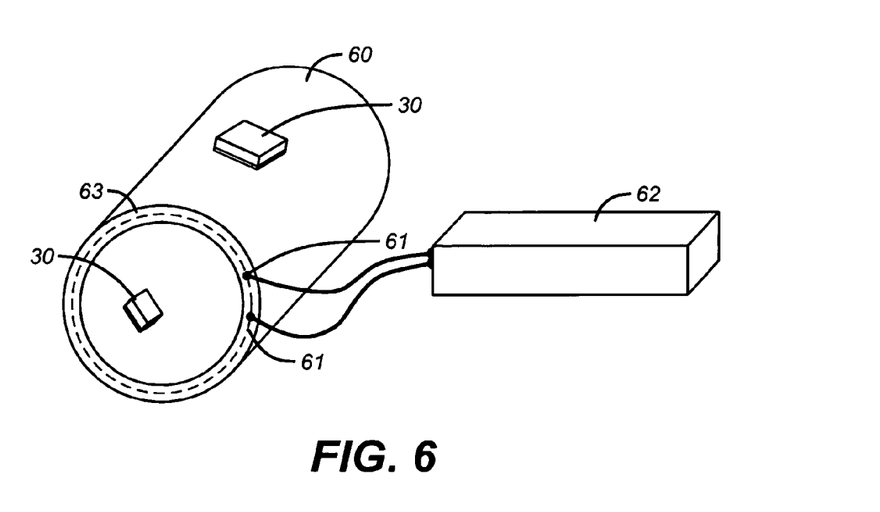
FIG. 6 is a schematic drawing of a composite conduit with embedded conductors for transmitting command signals and/or power to multiple measurement stations according to one embodiment of the present invention.

In one preferred embodiment, shown in FIG. 6, composite fluid conduit 60 has electrical conductors 61 embedded in the wall 63 of fluid conduit 60 during the manufacturing process for forming the conduit. Measurement stations 20 are disposed along the conduit at at least one of (i) on an internal walls of conduit 60, (ii) on an external wall of conduit 60, and (iii) embedded in a wall 63 of conduit 60. The electrical conductors 61 may be disposed substantially longitudinally in the wall of conduit 60. Alternatively, the electrical conductors 61 may be spirally wrapped in the wall of conduit 60. Electrical conductors 60 are connected to RF transceiver (not shown) in a controller 62. Power and command signals are transmitted through the conductors which act as RF antennas. The signals are detected by the measurement modules 30 along the conduit. The measurement stations 20 receive and convert the RF signals to power and command instructions for taking data from sensors in the measurement modules 30. The data are then transmitted via an RF signal that is received by the electrical conductors 61 and decoded by controller 62, according to programmed instructions. The signals from measurement stations 20 are suitably encoded and identified, using techniques known in the art, so as to be able to determine the measurement stations 20 associated with each data signal.

Figure 7:
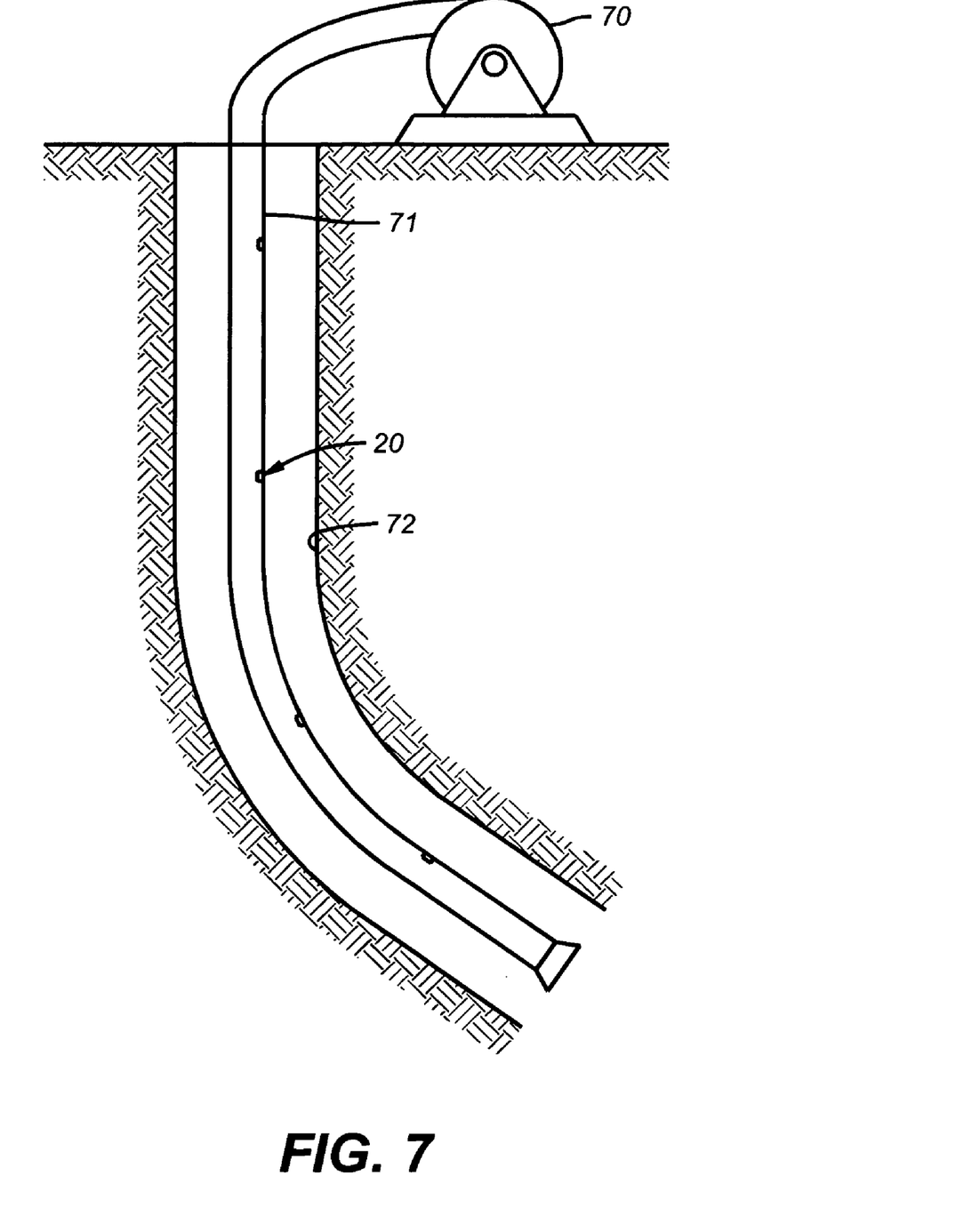
FIG. 7 is a schematic drawing of a coiled composite tubing having embedded conductors and a plurality of self contained measurement and information stations disposed along the tubing according to one embodiment of the present invention.

In one preferred embodiment, see FIG. 7, a composite conduit, as described previously having embedded electrical conductors and internal, external, and/or embedded measurement stations 20, may be formed as a coiled tubing 71 for use in drilling and/or completing a wellbore 72. Measurements from measurement modules 30, embedded in the coiled tubing 71, may be used to determine parameters of interest regarding the condition of the tubing string and/or parameters related to the drilling process. Such parameters of interest include, but are not limited to, (i) directional parameters, (ii) drilling induce vibration, including axial and torsional, (iii) weight on bit, (iv) downhole pressure, (v) downhole temperature, and (vi) formation parameters including natural gamma ray emission.

Figure 8:
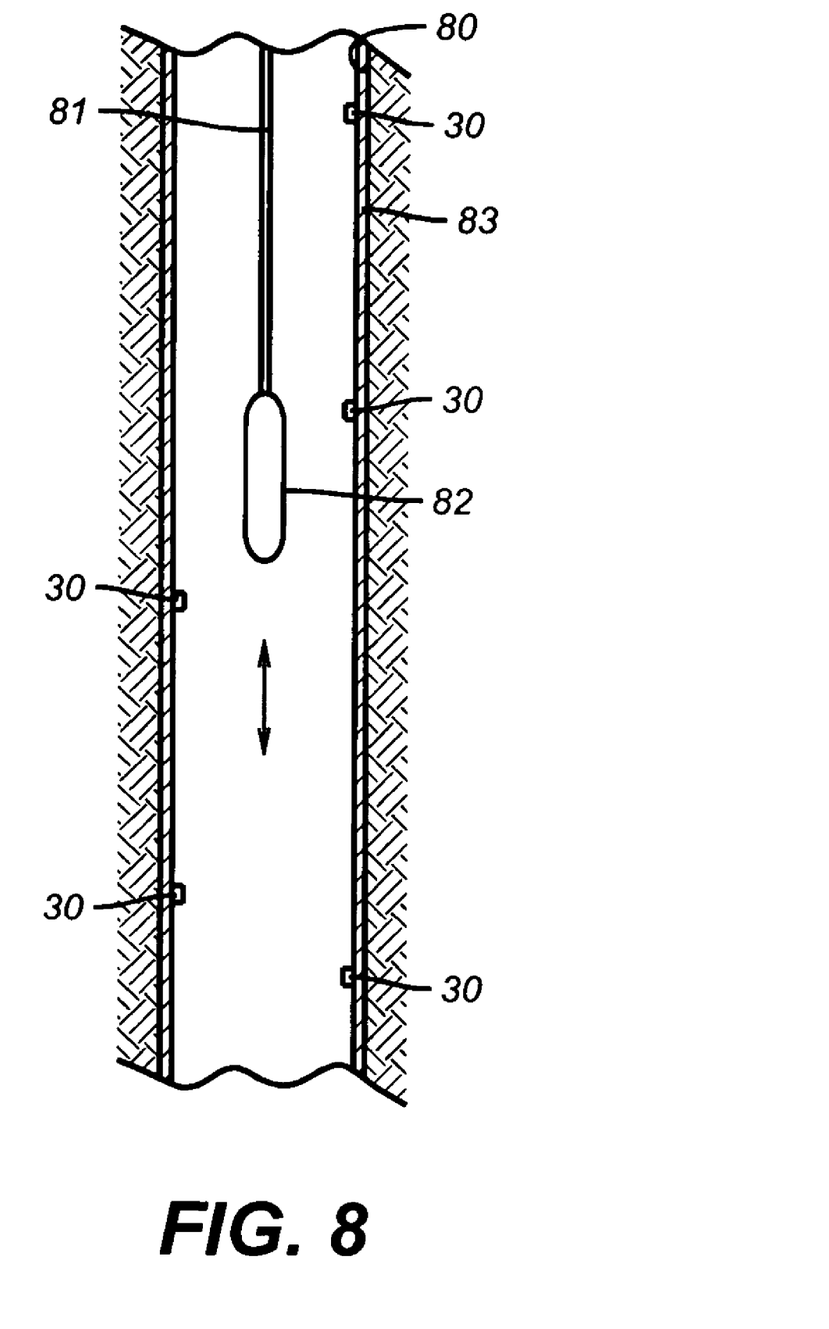
FIG. 8 is a schematic drawing of a casing with a plurality of self contained measurement and information stations disposed along the tubing and an interrogation device deployed on a tubular member according to one embodiment of the present invention.

In one preferred embodiment, see FIG. 8, metallic casing 83 is fixed in place in production wellbore 80. Measurement modules 30 are fixed to an internal surface of casing 83 and measure parameters of interest including, but not limited to, (i) fluid pressure, (ii) fluid temperature, (iii) fluid flow rate, (iv) corrosion, and (v) casing stress. An interrogation device 82 is deployed on wireline 81 and is passed in proximity to measurement modules 30 and has an RF transceiver that transmits RF power and command signals to measurement modules 30, which in turn, make measurements and transmit that data via RF transmission to interrogation device 82. Interrogation device 82 has internal memory for storing the received data and is downloaded at the surface. Alternatively, wireline 81 has electrical conductors and received data is transmitted directly to the surface. The interrogation device 82 may alternatively be deployed on a coiled tubing (not shown) using techniques known in the art.

Figure 9A:
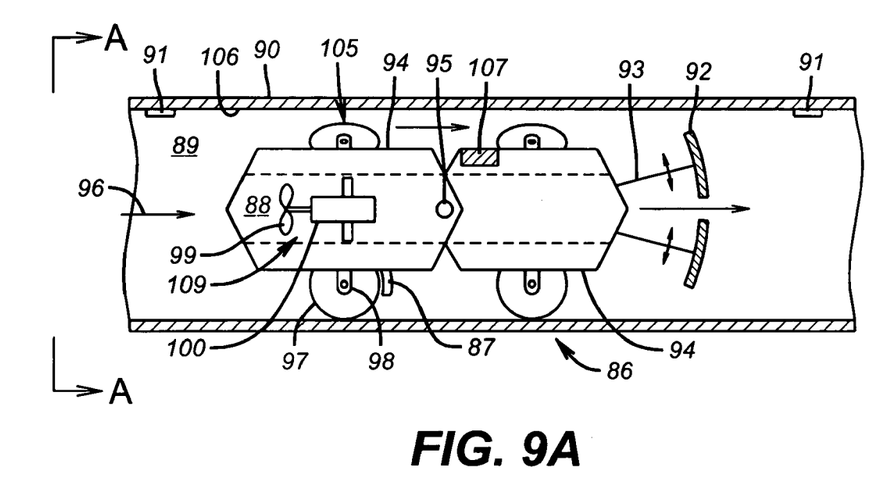
FIG. 9A is a schematic drawing of an interrogation vehicle traversing a pipeline according to one embodiment of the present invention.
Figure 9B:
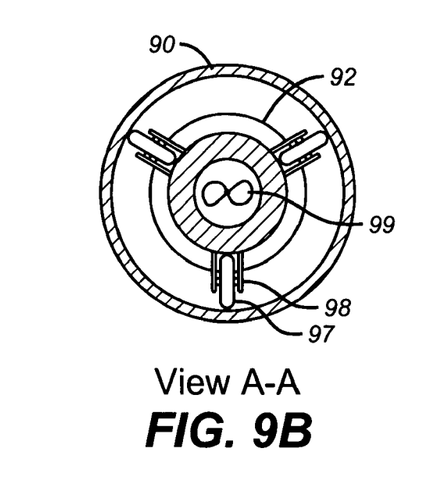
FIG. 9B is a schematic drawing showing View A—A depicted in FIG. 9A.
Figure 9C:
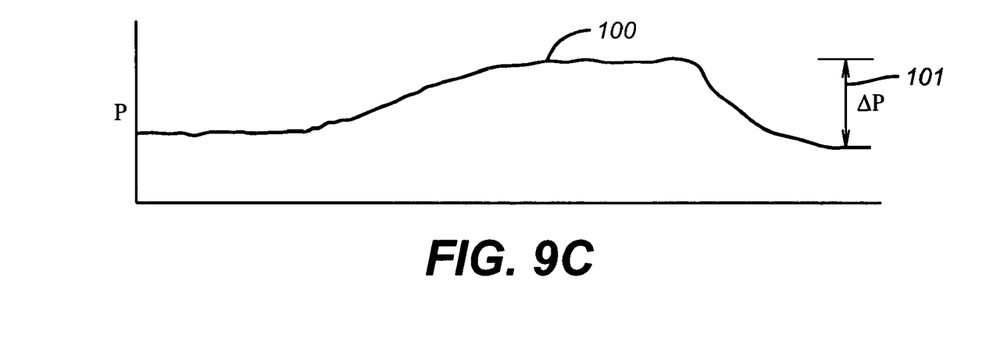
FIG. 9C is a schematic drawing showing a pressure profile in a pipeline caused by the movement of an interrogation device through the pipeline according to one embodiment of the present invention.

In another preferred embodiment, see FIGS. 9A–9C, a vehicle such as interrogation device 86 is adapted to traverse gas pipeline 90. Interrogation device 86 includes sail 92 for intercepting a portion of the flowing gas 96 which acts to provide motive force and propel interrogation device 86 along pipeline 90. Interrogation device 86 has multiple body sections, also called housings, 94 pinned together by pin 95 allowing device 86 to pivot and more easily traverse bends in pipeline 90. Body sections 94 have multiple wheel assemblies 105 disposed substantially symmetrically around body section 94. Preferably there are three wheel assemblies disposed around each body section. Each wheel assembly 105 includes a wheel 97 attached to an extendable arm 98. Each extendable arm 98 is individually extendable to force wheel 97 into contact with the inner wall 106 of pipeline 90. Extendable arms 98 may be electromechanically operated or hydraulically operated. Brake 87 is attached to at least one wheel assembly 105. Brake 87 may be actuated electromechanically and/or hydraulically to control the speed of interrogation device 86 along pipeline 90. Wheel assembly 105 has a rotational sensor (not shown) for determining the rotational speed of wheel 97. Such rotational information may be used by the controller to determine speed of interrogation device 86 as well as distance traveled along pipeline 90. Controller 107 also contains an realtime clock for time-stamping received transmissions from measurement stations 91.

Body sections 94 have a through passage 88 allowing a portion of flow 96 to pass through and actuate a power system, such as turbine-generator 109, positioned in flow passage 88. Flow 96 rotates impeller 99 which is operationally coupled to electrical generator 100 for generating electrical power usable in interrogation device 86. Impeller 99 may also be operationally coupled to a hydraulic pump for supplying hydraulic power to interrogation device 86. Alternatively, interrogation device 86 may be powered by batteries (not shown) carried in interrogation device 86. Electrical generator 100 supplies power to controller 107 via wires (not shown). Controller 107 includes a processor with memory for storing program instructions and for storing measured data. Controller 107 includes circuits for interfacing with and controlling brake 87 and sail 92 for controlling the speed of interrogation device 86 according to programmed instructions. Controller 107 also includes a radio frequency (RF) transceiver for transmitting and receiving signals from measurement stations 91 disposed on inner wall 106 of pipeline 90. Measurement stations 91 have substantially the same features and capabilities as those described previously with regard to FIGS. 1–6.

In one preferred embodiment, measurement station 91 obtains operational power from RF signals transmitted by controller 107. Alternatively, measurement station 91 may contain an internal power source including but not limited to (i) a commercially packaged battery, (ii) a thick film battery integrally attached to the measurement module, (iii) a piezoelectric power source deriving power from vibration and/or flow energy in the proximity of the measurement module, and (iv) a thermoelectric generator integrated into the measurement module. Measurement station 91 contains at least one sensor for detecting a parameter of interest related to the integrity of pipeline 90. Such parameters include, but are not limited to, (i) corrosion, (ii) pressure, (iii) temperature, (iv) fluid flow state, (v) vibration, (vi) chemical composition, (vii) mechanical strain, (viii) chemical contamination, (ix) radioactive contamination, (x) biological contamination, (xi) inclination of the pipeline, and (xii) seismic events.

Sail 92 acts to intercept a portion of flow 96 for propelling interrogation device 86 along pipeline 90. Sail 92 may be adjustable in size by adjusting supports 93 under command of controller 107. Sail 92 may be of any suitable shape.

In operation, interrogation device 86 is propelled along the internal passage 88 of pipeline 90 at a predetermined speed as controlled by controller 107. The obstruction to flow presented by interrogation device 86 creates a pressure differential 101 (see FIG. 9C) that is imposed on pipeline 90. The pressure differential 107 is related to the resistance to movement of interrogation device 86. The pressure differential may be controlled by adjusting the braking resistance and/or the sail size. The pressure differential versus speed may be calibrated for a given configuration and a known gas, such as air, and correction factors may be used to predict performance for other gases, such as hydrocarbons. The pressure differential 101 moves essentially as a wave with interrogation device 86 and impresses a strain in pipeline 86 in the area proximate interrogation device 86. Measurement stations 91 disposed along pipeline 90 may have sensors for measuring parameters of interest related to the strains in pipeline 90 as the pressure differential is imposed on the pipeline in the proximity of each measurement station. In one preferred embodiment, measurement station 91 contains sensors to measure the static pressure of the gas 96 flowing in pipeline 90. In addition, measurement station 91 has at least one sensor for measuring such parameters of interest, for example, as (i) axial strain on the pipeline, (ii) circumferential strain, also called hoop strain, on the pipeline, (iii) and acoustic emission from micro-fractures in the pipeline. Such strain gages may include mechanical strain gages and/or fiber optic strain gages. Such parameters are common indicators, known in the art, for indicating the integrity of a pipeline. For example, the strain measurements may be related to the combined stresses imposed on the pipeline by the pressure differential. Of particular interest would be changes in such readings over a period of time. Such changes in stresses could be indicative of metal loss due to corrosion and/or erosion. Changes in acoustic emissions from micro-fractures could be indicative of metal fatigue and/or crack growth, a major failure mechanism. Model relationships may be developed between the pressure differential and previously discussed parameters and such models, or relationships, monitored over time for the indicated changes. By transmitting the pressure information read by measurement station 91, controller 107 may compare the actual measured differential pressure to the predicted differential pressure. If the difference is outside a predetermined limit programmed into the processor, the processor adjusts the sail size and/or braking to bring the pressure differential back within limits. Such data may be presented in graphical form for ease of interpretation.

In one preferred embodiment, interrogation device 86, traverses pipeline 90 and interrogates each measurement station 91 as device 86 passes in proximity to each station 91. Each measurement station may have a unique digital identifier included in each transmission to interrogation device 91. The location of each measurement station along pipeline 90 is logged at installation of each measurement station. The use of the identifier for each station allows recalibration of the distance and speed indication of interrogation device 86 as it traverses between measurement stations 91 in pipeline 90.

The foregoing description is directed to particular embodiments of the present invention for the purpose of illustration and explanation. It will be apparent, however, to one skilled in the art that many modifications and changes to the embodiments set forth above are possible. It is intended that the following claims be interpreted to embrace all such modifications and changes.

What is claimed is:

1. A system for monitoring at least one parameter of interest relating to a pipeline having a fluid flow therein, comprising:
   a. at least one measurement station coupled to said pipeline for taking at least one measurement relating to the at least one parameter of interest; and
   b. a flow propelled interrogation device adapted to move proximate said at least one measurement station, said interrogation device further adapted to transmit a first signal to said at least one measurement station and to receive a second signal from the at least one measurement station relating to the parameter of interest.

2. The system of claim 1, wherein the flow propelled interrogation device comprises:
   i. a plurality of wheel assemblies mounted on at least one housing, said wheel assemblies extendable to contact an inner wall of said pipeline; and
   ii. a sail engaged with said at least one housing for intercepting at least a portion of said fluid flow for propelling said interrogation device along said pipeline.

3. The system of claim 2, further comprising a controller for controlling the motion of said interrogation device and for transmitting signals to and receiving signals from said at least one measurement station.

4. The system of claim 3, further comprising a power source supplying power to said controller.

5. The system of claim 3, wherein at least one of said plurality of wheel assemblies includes a brake acting cooperatively with said controller to control the speed of said interrogation device in the pipeline.

6. The system of claim 2, wherein the at least one housing includes a plurality of housings pivotally joined together to provide enhanced motion through at least one bend in said pipeline.

7. The system of claim 2, wherein the sail is adjustable in size.

8. The system of claim 7, wherein the controller adjusts the size of the sail according to programmed instructions to adjust the speed of the interrogation device in the pipeline.

9. The system of claim 1 wherein said at least one measurement station includes a sensor for making a measurement and a memory for storing data relating thereto.

10. The system of claim 1 wherein the at least one measurement station includes a power source for supplying power to the measurement station.

11. The system of claim 1 wherein the at least one measurement station is adapted to transmit data relating to the at least one parameter of interest upon receipt of a command signal.

12. The system of claim 1 wherein:
   i. the interrogation device sends a command signal to the at least one measurement station; and
   ii. the at least one measurement station transmits data upon receipt of the command signal.

13. The system of claim 1 wherein the at least one measurement station comprises a plurality of measurement stations disposed spaced apart along a length of the flow conduit.

14. The system of claim 1 wherein each of the at least one measurement stations includes sensors that provide measurements of at least two different parameters of interest.

15. The system of claim 1 wherein the at least one parameter of interest is selected from a group consisting of (i) corrosion, (ii) pressure, (iii) temperature, (iv) fluid flow state, (v) vibration, (vi) chemical composition,(vii) mechanical strain, (viii) chemical contamination, (ix) radioactive contamination, (x) biological contamination, (xi) inclination of said pipeline, and (xii) seismic events.

16. The system according to claim 1, wherein the at least one measurement station receives power from said interrogation device through a radio frequency transmission.

17. The system of claim 1 wherein the first signal and the second signal are radio frequency signals.

18. The system of claim 1 wherein the at least one measurement station includes interface circuitry and a processor acting according to programmed instructions.

19. The system of claim 17 wherein the at least one measurement station receives electrical power from said first signal.

20. The system of claim 1 wherein the at least one measurement station includes a real-time clock for time stamping a measurement event.

21. The system of claim 20 wherein said measurement event includes a measurement matching a predetermined criterion.

22. The system of claim 1 wherein the pipeline is made from a metallic material.

23. The system of claim 1, wherein the pipeline is made from a composite material.

24. The system of claim 1, wherein the pipeline is made from a cementitious material.

25. The system of claim 1, wherein teat least one measurement station is embedded in a flow conduit made of a composite material.

26. The system of claim 23, wherein the flow conduit made of a composite material includes at least one electrical conductor embedded along the length of said flow conduit, said electrical conductor adapted to act as an RF antenna for transmitting and receiving RF signals.

27. The system of claim 1, wherein the at least one measurement station receives power from a power source chosen from the group consisting of (i) a commercially packaged battery, (ii) a thick film battery integrally attached to the at least one measurement station, (iii) a piezoelectric power source deriving power from shock and vibration in the proximity of the measurement station, and (iv) a thermoelectric generator integrated into the measurement station.

28. The system of claim 1, wherein the fluid flow is a gas flow.

29. The system of claim 3, wherein the controller comprises:
   i. circuts for controlling the brake actuation and the sail size;
   ii. a processor and memory for performing predetermined instructions; and
   iii. an RF transceiver for transmitting and receiving said first and second signals.

30. The system of claim 4, wherein the power source comprises a turbine-generator disposed on said housing and adapted to intercept a portion of said fluid flow for deriving power therefrom.

31. The system of claim 4, wherein the power source comprises at least one battery.

32. A method for monitoring at least one parameter of interest relating to a pipeline having a fluid flow therein, comprising;
  a. coupling at least one measurement station to said pipeline at a predetermined location, said measurement station adapted to measure said at least one parameter of interest;
  b. passing a flow propelled interrogation device proximate said at least one measurement station;
  c. transmitting a first signal from said interrogation device to said measurement station, said measurement station measuring said at least one parameter of interest in response thereto; and
  d. receiving at said interrogation device a second signal related to said parameter of interest transmitted by said measurement station.

33. The method of claim 32 wherein the first signal and the second signal are radio frequency signals.

34. The method of claim 32, wherein the at least one measurement station receives power from said first signal.

35. The method of claim 32 wherein measuring at least one parameter of interest includes measuring at least one parameter selected from a group consisting of (i) corrosion, (ii) pressure, (iii) temperature, (iv) fluid flow state, (v) vibration, (vi) chemical composition, (vii) mechanical strain, (viii) chemical contamination, (ix) radioactive contamination, (x) biological contamination, (xi) pipeline inclination, and (xi) seismic events.

36. The method of claim 32 further comprising using a turbine-generator for intercepting a portion of said fluid flow and deriving power therefrom.

37. The method of claim 32, wherein the flow propelled interrogation device comprises:
  i. at least one housing;
  ii. a plurality of wheel assemblies mounted on said at least one housing, said wheel assemblies extendable to contact an inner wall of said pipeline;
  iii. a sail engaged with said housing for intercepting at least a portion of said fluid flow for propelling said interrogation device along said pipeline;
  iv. a controller for controlling the motion of said interrogation device and for transmitting signals to and receiving signals from said at least one measurement station; and
  v. a power source supplying power to said controller.

38. The method of claim 32, wherein the measurement station receives power from a power source chosen from the group consisting of (i) a commercially packaged battery, (ii) a thick film battery integrally attached to a measurement station, (iii) a piezoelectric power source deriving power from shock and vibration in the proximity of the measurement station, and (iv) a thermoelectric generator integrated into the measurement station.

39. The method of claim 32, wherein the fluid flow is a gas flow.

40. An interrogation device for determining at least one parameter of interest relating to a gas pipeline, comprising:
  a. at least one housing;
  b. a plurality of wheel assemblies mounted on said at least one housing, said wheel assemblies extendable to contact an inner wall of said pipeline;
  c. a sail engaged with said housing for intercepting at least a portion of said fluid flow for propelling said interrogation device along said pipeline;
  d. a controller for controlling the motion of said interrogation device and for transmitting at least one first signal to and receiving at least one second signal from at least one measurement station attached to said pipeline; and
  e. a power source supplying power to said controller.

41. The interrogation device of claim 40, wherein at least one of said plurality of wheel assemblies includes a brake acting cooperatively with said controller to control the speed of said interrogation device in the pipeline.

42. The interrogation device of claim 40, wherein the at least one housing comprises a plurality of housings pivotally joined together to provide enhanced motion through at least one bend in said pipeline.

43. The interrogation device of claim 40, wherein the sail is adjustable in size.

44. The interrogation device of claim 43, wherein the controller adjusts the size of the sail according to programmed instructions to adjust the speed of the interrogation device in the pipeline.

45. The interrogation device of claim 40 wherein the interrogation device is adapted to send at least one command signal to the at least one measurement station.

46. The interrogation device of claim 40 wherein the interrogation device is adapted to receive at least one data signal from said at least one measurement station.

47. The interrogation device according to claim 40, wherein the interrogation device transmits power to said measurement station through radio frequency transmission.

48. The interrogation device of claim 40, wherein the controller comprises:
  i. circuits for controlling the brake actuation and the sail size;
  ii. a processor and memory for performing predetermined instructions; and
  iii. an RF transceiver for transmitting and receiving said first and second signals.

49. The interrogation device of claim 40, wherein the power source comprises a turbine-generator disposed on said housing and adapted to intercept a portion of said fluid flow for deriving power therefrom.

50. The interrogation device of claim 40, wherein the power source comprises at least one battery.

51. A method for determining at least one parameter of interest related to a pipeline having a gas flowing therethrough, comprising:
  a. traversing an interrogation device through the pipeline such that said interrogation device is adapted to provide a predetermined pressure disturbance for inducing a predetermined strain in said pipeline;
  b. transmitting a first signal from said interrogation device to each of a plurality of measurement stations attached to said pipeline at a plurality of predetermined locations, each of said plurality of measurement stations measuring said at least one parameter of interest in response thereto; and
  c. receiving a second signal related to said parameter of interest at said interrogation device transmitted by each of said plurality of measurement stations.

52. The method of claim 51, further comprising generating a relationship between said parameter of interest and said pressure differential at each predetermined location.

53. The method of claim 52, further comprising presenting a graphical presentation of said relationship.

54. The method of claim 51, wherein the interrogation device comprises:
  i. at least one housing;
  ii. a plurality of wheel assemblies mounted on said at least one housing, said wheel assemblies extendable to contact an inner wall of said pipeline;
  iii. a sail engaged with said housing for intercepting at least a portion of said fluid flow for propelling said interrogation device along said pipeline;
  iv. a controller for controlling the motion of said interrogation device and for transmitting at least one first signal to and receiving at least one second signal from at least one measurement station attached to said pipeline; and
  v. a power source supplying power to said controller.

55. The method of claim 54, wherein at least one of said plurality of wheel assemblies includes a brake acting cooperatively with said controller to control the speed of said interrogation device in the pipeline.

56. The method of claim 54, wherein the at least one housing includes a plurality of housings pivotally joined together to provide enhanced motion through at least one bend in said pipeline.

57. The method of claim 54, wherein the sail is adjustable in size.

58. The method of claim 57, wherein the controller adjusts the size of the sail according to programmed instructions to adjust the speed of the interrogation device in the pipeline.

59. The method of claim 51, wherein said parameter of interest is at least one of (i) axial strain, (ii) hoop strain, and (iii) ultrasonic micro-crack emission.

* * * * *